Patented Dec. 6, 1938

2,139,304

UNITED STATES PATENT OFFICE 2,139,304

COFFEE-CHOCOLATE SIRUP CONCENTRATE

Elizabeth C. Forbes, Baltimore, Md.

No Drawing. Application February 15, 1936,
Serial No. 64,184

1 Claim. (Cl. 99—23)

This invention relates to the canning of a sirup concentrate for making a chocolate beverage and in particular, a coffee flavored chocolate drink.

Up to the time of the present invention great difficulty has been experienced in the preservation of chocolate paste or sirup due to the large fat constituent of the chocolate, which renders it susceptible to rancidity even when hermetically sealed, on account of the instability of the fats in the presence of such absorbed oxygen as cannot by ordinary measures be eliminated from the fat globules, and which causes it to break down into objectionable aldehydes and ketones.

So baffling has been the problem of preserving chocolate, that insofar as I am aware, there is no canned true chocolate sirups on the market, those of the chocolate type being in fact, cocoa sirups or pastes with chocolate flavor.

One of the objects of the present invention is the provision of a process for preparing chocolate sirup or paste so as to enhance its keeping qualities.

Another object of the invention is to combine coffee extract with the chocolate, thereby not only producing the makings of a beverage having a coffee-chocolate flavor, but also, by virtue of the combination, still further fortifying the compound against rancidifying.

The process of the present invention is founded upon several factors as follows:

1. Reduction in the size of the fat globules of the chocolate so that a greater surface of the globules is exposed to the fortifying treatment, this being accomplished by emulsification, of the chocolate in an optimum manner to obtain the maximum degradation in the size of the globules.

2. Removal of the oxygen, that is to say, the air, not only that which surrounds the globules, but that which has been absorbed by them.

3. The replacement of the air by an oxygen-free inert gas.

4. Preventing coalescing of the comminuted globules of the emulsion by having saturated the emulsified liquid with a colloid extract such as coffee.

5. Employing the caffeine in the coffee extract as a complementary rancidity inhibitor.

In making my coffee flavored chocolate sirup or paste, I provide a strong aqueous extract of coffee. This may be made in any suitable manner, but I prefer to pour boiling water over a quantity of ground coffee, to draw the water quickly through the coffee by vacuum, return it again to the coffee, and repeat this operation several times until the extract has great strength. The extract is then divided into two batches.

By way of a specific example, let it be assumed that 40 pounds of chocolate is to be treated. For this purpose, 4 gallons of coffee extract is prepared, one gallon of which is employed for the melting in of the chocolate and 3 gallons for dissolving 40 pounds of sugar in making sugar sirup. The chocolate preferably in finely comminuted state is gradually added to the coffee extract, the latter being maintained at a temperature of from 80° to 100° F. The extract is thoroughly stirred during the entire melting operation.

The chocolate-coffee mix and the coffee-sugar sirup are then poured together in a heating kettle capable of being hermetically closed and subjected to a vacuum of 25 inches, at a temperature of from 80° to 120° F. The mixture is mechanically stirred, but not until the vacuum has been created. The heating has the effect of expanding and driving out some of the absorbed air which is carried off in the vacuum. Since the agitation takes place in a vacuum the entrainment of air in the mix is avoided.

The vacuum step of the process is continued for approximately 20 minutes, although the time interval is not critical after which carbon dioxide gas is admitted to the kettle until the vacuum has been changed to a pressure of approximately 36 pounds. This assures the absorption of carbon dioxide by the fat globules, to take the place of the air drawn out during the vacuum treatment.

In order to assure that all residual air is removed, the temperature of the mixture while under the pressure of the carbon dioxide may be raised to 130° to 140° F. which will expand the carbon dioxide absorbed by the fat globules, causing it to penetrate still deeper into the globules and to force out any remaining air. While the mixture is under the pressure of the carbon dioxide, it is agitated to form a smooth and intimate emulsion between the fat of the chocolate and the extract of coffee.

The pressure stage is maintained for a time period of approximately 20 minutes, then the pressure of carbon dioxide is reduced to approximately 2 pounds and the sirup is run into cans. No particular pains need be taken to keep it under pressure while being discharged from the kettle to the cans for the pressure of 2 pounds at which it leaves the kettle is sufficient to enable the absorbed carbon dioxide to retain some pressure in the product after it has been canned and sealed. The release of the carbon dioxide in the cans from the carbon dioxide impregnated sirup drives out all air from the cans which may be immediately sealed.

The final steps of the process are boiling the sealed cans for 12 minutes at a temperature of 212° F. and gradually cooling the cans. It is most important that the cooling be gradual and not sudden since it is well known that a chocolate-sugar compound is readily "shocked" by sudden cooling which will make the sirup grainy and impair its solubility and usefulness as the ingredient for a beverage. It also undergoes some physical change so that the fat globules will not remain in suspension in the coffee infusion.

Now, in order to get as strong a coffee flavor as possible into the compound, it is necessary that all of the liquid used in the process shall be coffee extract; otherwise, that is to say, if clear water were used either in melting the chocolate or making the sugar-sirup, the coffee concentration would be dilute. There is a much more important reason, however, for melting the chocolate in coffee extract instead of in plain water. The coffee extract is a colloidal infusion and each of the small water particles which associates with a small fat globule in the act of emulsion presents a surface in which the molecular interstices are filled with the colloidal matter. This prevents coalescence of the fat globules, and the caffeine assists in inhibiting the development of rancidity on the contacting surfaces of the small fat globules.

The mixing of the coffee extract with the sugar also assures that the intermolecular spaces of the sugar solution shall be filled with the coffee extract so that when a common emulsion is made between the fat globules and the combined emulsifier represented by the coffee extract in the sugar as well as that in which the chocolate is melted, the globules will be of minimum size and will be prevented from coalescing.

The drawing out of the oxygen by the vacuum also has the mechanical effect of sub-dividing the fat globules in emulsion and the immense multiplicity of new surfaces created by the sub-division of the normal fat globules not only permits the absorbed oxygen to escape, but also when the carbon dioxide is admitted permits the carbon dioxide to enter the innermost interstices vacated by the oxygen.

I have found that a coffee-chocolate sirup or paste made according to the outlined process has unexcelled keeping qualities, that it keeps indefinitely while the can is sealed and shows no signs of rancidity within several weeks after the can is opened, this being doubtless due to the fact that carbon dioxide still saturates the fat globules and that being a heavy gas, it does not readily diffuse with the surrounding air.

I have found also that the coffee flavor of the product is more delicious and pronounced, and not impaired by spurious flavors which ordinarily accompany the reaction which causes rancidity.

Although the presence of the coffee extract has a definite preservative as well as flavoring effect upon the chocolate concentrate, and plain chocolate concentrate may be made following the process of the present invention excepting that in the place of the coffee extract, plain water or preferably sterilized milk may be employed, both as the vehicle in which the chocolate is melted and the liquid ingredient in the sugar sirup.

While I have in the above description disclosed what I know to be a practical embodiment of my invention, it will be understood that the specific proportions of ingredients as mentioned are merely by way of example and that the technique of the process can be varied without transcending the scope of the invention which is defined by the terms of the appended claim.

What I claim is:

Process for making a chocolate concentrate fortified against rancidity comprising melting the chocolate in a suitable liquid containing a high density of flavorful solid colloidal coffee particles, mixing the chocolate and the medium in which it is melted with sugar sirup made of sugar dissolved in a liquid containing a high density of the same flavorful colloidal particles, emulsifying the fat content of the chocolate by agitation of the mixture, drawing a vacuum on the mixture to remove both the ambient and absorbed air from the fat globules of the emulsion impressing carbon dioxide on the evacuated mixture for replacing the withdrawn air, canning and sealing the mixture while under some carbon dioxide pressure, and sterilizing the sealed mixture in the cans.

ELIZABETH C. FORBES.